United States Patent [19]
Pasztor

[11] Patent Number: 5,465,681
[45] Date of Patent: Nov. 14, 1995

[54] COATING ROLL DRIVE

[75] Inventor: Julius Pasztor, Penfield, N.Y.

[73] Assignee: Eastman Kodak Company, Rochester, N.Y.

[21] Appl. No.: 204,701

[22] Filed: Mar. 2, 1994

[51] Int. Cl.$^6$ .................................................. B05C 11/00
[52] U.S. Cl. ...................... 118/680; 118/DIG. 2; 118/671
[58] Field of Search ........................... 118/410, 411, 118/680, DIG. 2, DIG. 4, 681, 679, 419, 671, 712, 325, 315; 310/90.5

[56] References Cited

U.S. PATENT DOCUMENTS

| | | | |
|---|---|---|---|
| 4,529,628 | 7/1985 | Haour et al. | 118/DIG. 2 |
| 4,641,978 | 2/1987 | Kapich | 384/102 |
| 4,683,391 | 7/1987 | Higuchi | 310/90.5 |
| 4,864,300 | 9/1989 | Zaremba | 341/6 |
| 4,883,691 | 11/1989 | McIntyre | 118/681 |
| 4,999,533 | 3/1991 | King et al. | 310/90 |
| 5,027,280 | 6/1991 | Ando et al. | 364/474.16 |
| 5,134,958 | 8/1992 | Zimmer | 118/413 |
| 5,302,203 | 4/1994 | Zimmer | 118/249 |

FOREIGN PATENT DOCUMENTS

| | | |
|---|---|---|
| 153117 | 11/1981 | Japan . |
| 57-137740 | 8/1982 | Japan . |

*Primary Examiner*—Brenda Adele Lamb
*Attorney, Agent, or Firm*—Carl F. Ruoff

[57] ABSTRACT

The present invention is an improved coating roll drive that used frameless, inside out motor and a set of magnetic bearings, axial and radial, mounted inside a coating roll to provide adaptive positioning of the coating roll relative to a given reference, such as a hopper lip. The present invention minimizes the variation of distance between the coating roll and the given reference during operation.

4 Claims, 3 Drawing Sheets

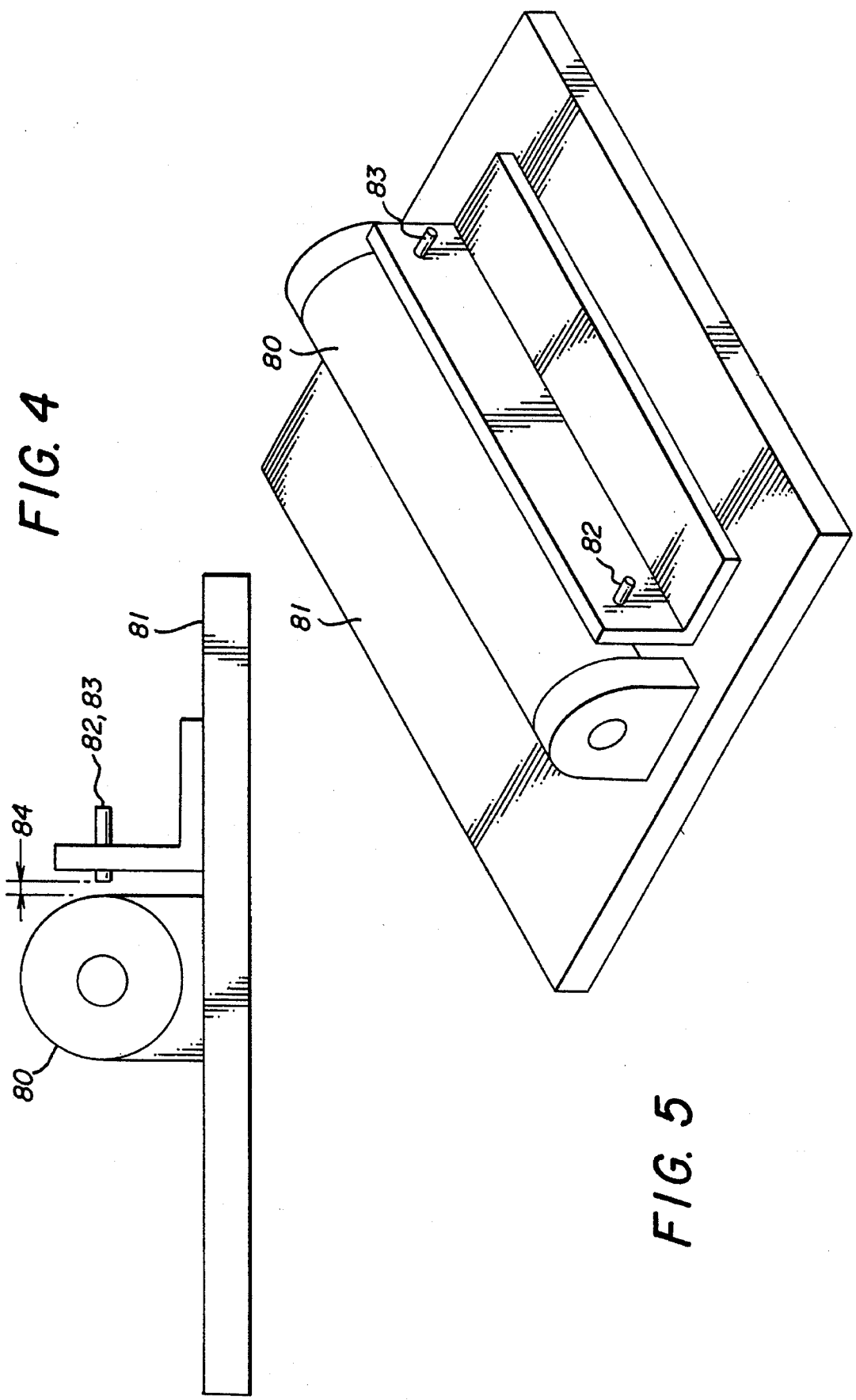

COATING ROLL DRIVE

FIELD OF THE INVENTION

The present invention is a drive system for a coating roll which provides positioning of the coating roll relative to a reference line. More particularly, the present invention is a method and apparatus to improve coating uniformity in a bead coating operation.

BACKGROUND OF THE INVENTION

The bead coating technique for coating liquid layers on a moving substrate is characterized by the formation of a puddle or bead between the lip of the coating hopper and the surface of the web to be coated. The bead extends completely across the width of the web being coated. The primary function of the coating roll is to support the moving web in the coating operation and to establish and maintain a clearance between the hopper lip and the moving web. Various patents that describe this technique are U.S. Pat. No. 2,761,419 and 2,761,791.

Since the primary function of the coating roll is to provide a reference surface for the hopper lip, it is mandatory that the set distance between the web supported on the coating roll and the hopper lip remains constant and uniform during operation. Due to the manufacturing process, every roll has a runout, which results in a periodic variation of the distance between the roll envelope and the hopper lip. This runout referred to as FIM (Full Indicator Movement) is the deviation from perfect form of a part surface or revolution detected by full rotation of the part on a datum axis, using a dial indicator. FIM is defined as the total movement of a dial indicator or comparable measuring device applied normal (perpendicular) to a surface. FIM values always apply normal to the true surface profile. By reducing the FIM of the roll, one can achieve more uniform coatings.

At the present time, an overall accuracy of 100 to 120 microinch FIM is the best that can be expected from a coating roll installed on any of the prior art coating machines. However, with increasing requirements for thinner coatings it is necessary to increase the mechanical accuracy of the coating roll and, therefore, reduce the runout.

Additionally, during the coating operation it is necessary to allow a splice to pass between the hopper lip and the coating roll. Thus, the hopper has to be retracted and subsequently repositioned. This can introduce an additional error in the coating thickness by changing the gap between the hopper lip and the coating roll.

The present invention is a method and apparatus for reducing the effect of the inaccuracies caused by hopper positioning and coating roll runout which result in coating thickness variations.

SUMMARY OF THE INVENTION

The present invention is an apparatus for conveying a web through a bead coating station, the bead coating station including a hopper having a plurality of parallel metering slots between a plurality of hopper elements which form an inclined surface. The inclined surface terminates at a lip. The apparatus includes a coating roll for conveying a web, the coating roll having an axis parallel to the metering slots and spaced apart a distance from the lip. The coating roll includes electromagnetic bearings for radially and axially supporting and positioning the coating roll by magnetic forces without contacting the coating roll. Sensors for detecting the distance between the coating roll and the hopper lip and generating a signal in response to the distance between the lip and the coating roll are also included. Finally, control circuit responsive to the signal generated from the sensors control the current flowing to the electromagnetic bearings wherein the distance between the lip and the coating roll is controlled to a predetermined value.

BRIEF DESCRIPTION OF THE DRAWINGS

FIG. 4 shows a side view of a test set-up used with a coating roll of the present invention.

FIG. 5 shows a perspective view of the test setup used with a coating roll of the present invention.

For a better understanding of the present invention together with other objects, advantages and capabilities thereof, reference is made to the following description and appended claims in connection with the above-described drawings.

DETAILED DESCRIPTION OF THE INVENTION

Figure 1:
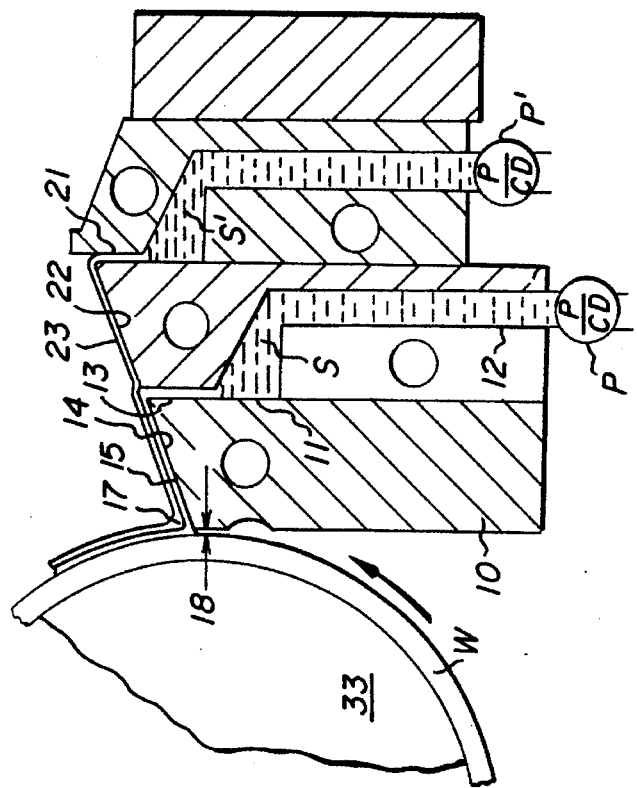
FIG. 1 shows a cross sectional view of a bead coating operation.

Shown in FIG. 1 is an apparatus for bead coating a support. FIG. 1 shows a double slide hopper 10 having a cavity 11 into which a fluid of coating composition S is continuously pumped at a given rate by a metering or constant discharge pump P through inlet 12. A second fluid composition $S^1$ is pumped through $p^1$. The coating composition S is then forced from the cavity 11 through a narrow vertical slot 13 in the form of a ribbon and out onto a downwardly inclined surface 14 down which it flows by gravity in the form of a layer 15 onto a coating bead 17 formed between the surface of the web W to be coated and the lip of the slide surface. Likewise, the coating composition $S^m$ is forced through slot 21 onto surface 22 where it forms a layer 23 which flows over layer 15. The web W is backed up by a coating roll 33 which serves as a means of continuously moving the web across and in contact with the bead 17 as well as serving as a means for supporting and holding the web smooth while passing across the bead of the coating.

During a coating operation it is necessary to control the space 18 between the web W supported by the coating roll 33 and the hopper lip. With existing manufacturing technology, the accuracy of the coating roll assembly cannot be improved below 0.0001 inches FIM limit for the coating roll. The present invention provides a way to improve this accuracy by providing dynamic correction during the coating operation. Using active magnetic bearings for suspension, the envelope of the bearing rotor and the coating roll are held in position by an electromagnetic force. The roll position is constantly monitored relative to the hopper by sensors which communicate with the electronic control system. When the roll deviates from its desired position, the control system adjusts the current flowing to the electromagnets and brings the rotor, with the coating roll, back to the proper position.

This continuous compensation reduces the apparent FIM of the assembly and only a virtual FIM will be seen by the hopper, which is an order of magnitude less than the actual FIM. Consequently, the variation of the distance between the hopper lip and the roll is greatly reduced.

Figure 2:
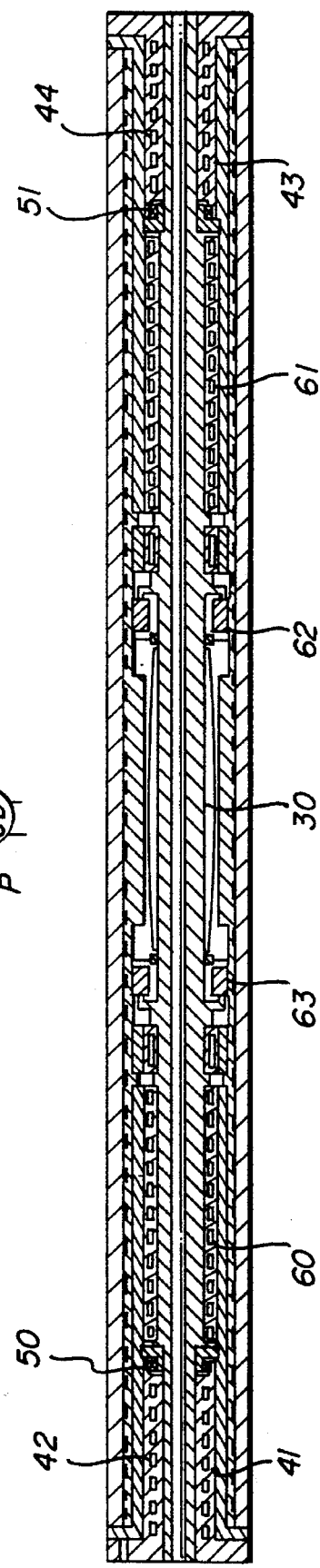
FIG. 2 shows the coating roll of the present invention.

FIG. 2 shows the driving coating roll assembly of the present invention. The assembly is held in position by the main roll support 30, which being at the center of the assembly provides in addition to the support, the wire way for all the control and power connections. It is made of a high strength material, such as alloy steel, and it is under very high tension forces, to minimize lateral deflection and consequently increase its stiffness. It is anchored to the machine frame (not shown), which is separated from the frame of the coating station (not shown). This separation is required to minimize transmitted vibration between the coating station and the machine support. All rotating members of the assembly are supported on a set of magnetic bearings 41, 42, 43 and 44. The bearings provide radial and axial support by magnetic force without contact with the main roll support 30. Two auxiliary ball bearings 50 and 51 provide support when the magnetic bearings are intentionally deenergized and/or in the case of a power failure. The running clearance between the ball bearings' outer race and rotating members is 0.01 inches during normal operation.

The drive motors 60 and 61 are placed symmetrically relative to the centerline of the roller and are the so-called inside-out design, having the outer member as the rotating component of the motor. The motor is a variable speed brushless DC type with high efficiency to minimize power losses in the motor.

The rotational speed feedback to the motor 60, 61 are provided with a pair of optical encoders 62, 63 coupled to the roll with a coupling having high stiffness in the angular direction and low stiffness in the radial and axial directions. High angular stiffness is required for accurate speed monitoring, low radial and axial stiffness are needed because in the case of a deenergized bearings the assembly is displaced 0.01 inches in the radial direction.

All heat generated by the motors and the bearings are removed through the envelope of the coating roll. To minimize the effect of the uneven heat source along the coating roll a heat pipe is mounted between the roll and the drive components. The function of the heat pipe is two-fold, namely to equalize the temperature so the roll envelope is at a uniform temperature and to control this temperature as needed by the product. Controlling the temperature requires external heat sinks and/or sources connected to the heat pipe.

As can be seen from FIG. 2 all components of the rotational drive with the necessary feedback devices are inside the coating roll. This reduces the physical size of the assembly to an absolute minimum, and provides complete freedom in the design of the coating station. No coupling is used in the connection of the rotor to the roll which guarantees a solid backlash free connection. Stiffness of the assembly can be altered very easily, by changing the roll diameter and/or wall thickness.

The assembly of the present invention requires only two bearings as the two shafts, motor and roll, are combined into one. Consequently, the assembly and alignment of the coating roll drive is greatly simplified. The design is modular and can be assembled in advance on a rigid base to facilitate installation and maintenance procedures. Supporting the motor and the roll with axial and radial magnetic bearings, the roll levitates during operation, eliminating any physical contact between the roll and the environment, consequently reducing and/or eliminating the transmission of vibration from machine frame to the coating roll and vice versa. Using the adaptive feature of the invention, one can reduce the effect of the mechanical runout on the coating roll assembly. This dynamic correction is not a substitute for an accurately machined and installed roll, but a great improvement.

Figure 3:
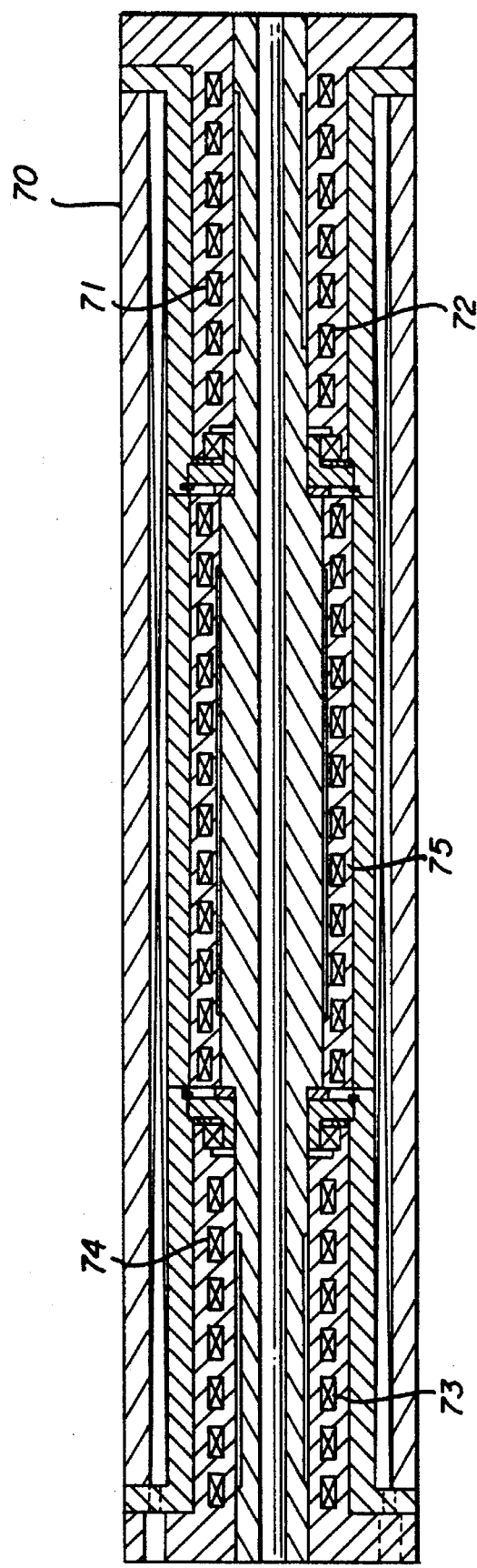
FIG. 3 shows the coating roll used in the test set-up of FIGS. 4 and 5.

The roll 70 shown in FIG. 3 was similar to that used in the test set-up shown in FIGS. 4 and 5. The roll shown in FIG. 3 was supported on four magnetic bearings 71, 72, 73, 74. Two of the magnetic bearings supported the roll axially and two supported the roll radially. An internal drive motor 75 was used to drive the roll 70.

EXAMPLE 1

The test set-up is shown in FIGS. 4 and 5 wherein the coating roll 80 was mounted on base 81. The roll 80 was 6.5 inches in diameter and 14 inches long. The roll and magnetic bearings assembly was obtained from MBI Engineering. The roll speed was approximately 200 rpm. Two capacitance gauges 82, 83 were used to monitor the clearance of the roll. In actual application the reference would be the hopper lip. Using an Accumeasure 1000 System with an S1021-PA amplifier and, electronics built by MBI, it was possible to constantly monitor the surface of the 6.5 inch diameter roll relative to the established reference line to monitor the gap 84 and to dynamically shift the center of rotation so that the roll's runout error relative to the reference was significantly reduced.

During the test, it was proven through measurement that by using the adaptive roll positioning, the effect of runout in the test setup was reduced seven-fold. The existing 140 micro inch FIM was reduced to approximately 20 micro inches. It is, therefore, estimated that an order of magnitude improvement can be achieved using electromagnetic bearings.

While there has been shown and described what are presently considered the preferred embodiments of the invention, it will be obvious to those skilled in the art that various alterations and modifications may be made therein without departing from the scope of the invention.

What is claimed:

1. An apparatus for conveying a web through a bead coating station, comprising:

a hopper for applying coating onto the web, the hopper having a plurality of parallel metering slots between a plurality of hopper elements which form an inclined surface, the inclined surface terminating at a lip;

a coating roll for conveying the web, the coating roll having an axis parallel to the metering slots and being spaced apart a distance from the lip;

electromagnetic bearings for radially and axially supporting said coating roll by magnetic forces without contacting said coating roll;

sensors for detecting the distance between said coating roll and the lip and generating a signal in response to the distance; and control circuitry responsive to the signal from said sensors for controlling currents flowing to said electromagnetic bearings wherein the distance between the lip and said coating roll is controlled to predetermined value.

2. The apparatus according to claim 1 further comprising:

auxiliary ball bearings for supporting said coating roll when said electromagnetic bearings are deactivated.

3. The apparatus according to claim 1 further comprising:

a pair of inside-out drive motors positioned within and symmetrically arranged about the center of said coating roll for driving said coating roll.

4. The apparatus according to claim 1 wherein said sensors are capacitance gauges.

* * * * *